April 18, 1961 D. L. LEETE 2,980,838
POSITION CONTROL SERVOSYSTEM
Filed Oct. 12, 1959 6 Sheets-Sheet 1

INVENTOR
DAVID LATCHAM LEETE
BY

April 18, 1961  D. L. LEETE  2,980,838
POSITION CONTROL SERVOSYSTEM
Filed Oct. 12, 1959  6 Sheets-Sheet 5

INVENTOR
DAVID LATCHAM LEETE

BY  Larson and Taylor

INVENTOR
DAVID LATCHAM LEETE
BY

United States Patent Office 2,980,838
Patented Apr. 18, 1961

2,980,838
POSITION CONTROL SERVOSYSTEM

David Latcham Leete, Stockport, England, assignor to National Research Development Corporation, London, England, a corporation of Great Britain Filed Oct. 12, 1959, Ser. No. 845,856
Claims priority, application Great Britain Oct. 15, 1958
8 Claims. (Cl. 318—28)

This invention relates to automatic systems for controlling relative movement between two objects and is particularly though not exclusively applicable to automatic machine tool control systems in which the movements of the various members of the machine tool are controlled in accordance with a programme which may be stored on a recording medium (e.g. punched card or magnetic tape) in the form of signals to which the control system is responsive. The invention will be described in relation to a system of this type.

The accuracy of the control system is frequently of a much higher level than that of the machine tool. Various erratic movements of the machine tool parts can occur due to such causes as manufacturing tolerances, clearances, distortion of machine tool parts, wear etc.

Typical examples of these erratic movements which will cause inaccuracies in the final position of the cutting edge of the tool are, sideways movement of the saddle in a milling machine or lathe due to clearances in or wear of the longitudinal slideways, rocking of the saddle under cutting loads, rocking of a cross slide, and misalignment of a cutting tool spindle in the case of a milling machine.

The erratic movement or movements can be detected by suitable detecting means mounted at various positions on the machine. An example of a method of detecting these movements is described in British Patent 807,994.

According to the invention there is provided a servo system for controlling the operation of driving means for producing the movement of a first object relative to a second object the system comprising monitoring means for indicating the movement of the first object relative to the second object the output of the monitoring means taking the form of a cyclic monitor signal the frequency of which is a function of the velocity of said movement, means responsive to two incoming signals for controlling the driving means in conformity with such signals in combination in a feedback servo loop, one of said incoming signals being a command signal and the other of said incoming signals being the said cyclic monitoring signals and means responsive to modification signals for shifting the phase of one of the said incoming signals whereby the response of the said feedback servo loop to the said command signal is modified under control of the said modification signals.

The monitor signals, being of cyclic form provide a convenient form of signal for phase shifting and according to one feature of the invention there is provided a servo system for controlling the operation of driving means for producing the movement of a first object relative to a second object, monitoring means for indicating the movement of the first object relative to the second object, the output of the monitoring means taking the form of cyclic monitor signals the frequency of which is a function of the velocity of said movement, means for controlling the driving means in conformity with incoming command signals in combination with the said cyclic monitor signals in the feedback servo loop, and means responsive to incoming modification signals for shifting the phase of the said cyclic monitor signals, whereby the response of the said feedback servo loop to the said command signals is modified under control of the said modification signals.

When the command signals are of a suitable cyclic form they also provide a convenient form of signal for phase shifting and according to the invention there is further provided a servo system for controlling the operation of driving means for producing the movement of a first object relative to a second object, the system comprising monitoring means for indicating the movement of the first object relative to the second object, the output of the monitoring means taking the form of cyclic monitor signals the frequency of which is a function of the velocity of the said movement, means for controlling the driving means in conformity with incoming cyclic command signals, the frequency of which is a function of the velocity of the required relative movement between the said two objects, in combination with the said cyclic monitor signals in a feedback servo loop, and means responsive to incoming modification signals for shifting the phase of the said cyclic command signals, whereby the response of the said feedback servo loop to the said command signals is modified under control of the said modification signals.

The embodiments of the invention described below are of the system in which the modification information is injected into either the monitor signal side or the command signal side of the system so as to modify the phase of either the monitor signal or the command signal.

Two commonly used alternative methods of obtaining the monitoring signals consist on the one hand of a pair of inductively coupled elements making relative movements corresponding to the relative movements of the machine members, and on the other hand a pair of diffraction gratings making similar relative movements and optical means for detecting such relative movements.

The invention will be more readily understood from the following description of certain embodiments of the invention together with the accompanying drawings in which.

The object of the invention is to provide means for readily correcting for any missmovement of the parts of a machine tool that will affect the relative position of the cutting tool and the workpiece.

Figure 1:
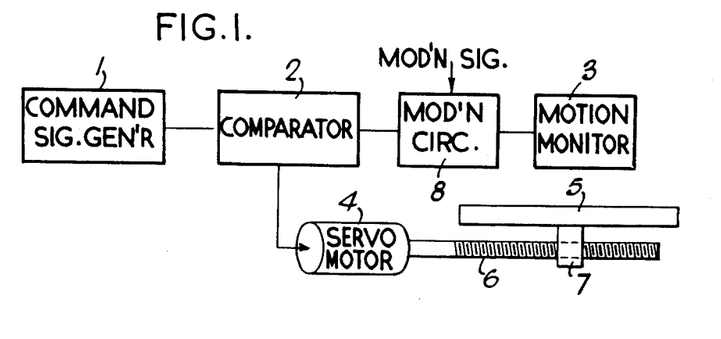
Figure 1 is a schematic diagram illustrating a typical servo control system where the phase of the monitoring signal is modified.

In Figure 1 the invention is shown applied to an example of one type of machine tool control. Without the addition of the present invention the system would consist of a command signal generator 1, a comparator 2 receiving a signal from the command signal generator and from a motion monitor 3. The output from the comparator controls a servo motor 4, this servo motor in turn driving machine table 5 through suitable means such as lead screw 6 and nut 7. The motion monitor 3 monitors the movement of table 5.

The invention may be applied to a system of this kind by inserting a modification circuit 8 which acts to modify the signal from the motion monitor 3 in accordance with a modification signal.

The modification signal is obtained from modification signal generators mounted on the machine tool at various places to detect and indicate movements of parts of the machine other than those required. Such erratic movements of the machine parts may have components of motion in more than one direction and the modification signal generators are so positioned that a modification signal is obtained for each of the components of motion. Modification signals resulting from such erratic movements which have a component of motion in a particular direction are combined (when more than one) and applied to the control system of a slide movable in that direction.

It is necessary in control systems of the type illustrated in Figure 1 to have some means of sensing the direction of relative motion between the two machine parts and indicating this direction of motion by varying a characteristic of the monitoring signals. One solution of this problem is to generate two monitoring signals having quadrature phase relationship so that the relative phase of these two quadrative signals indicates the direction of motion.

Figure 2:
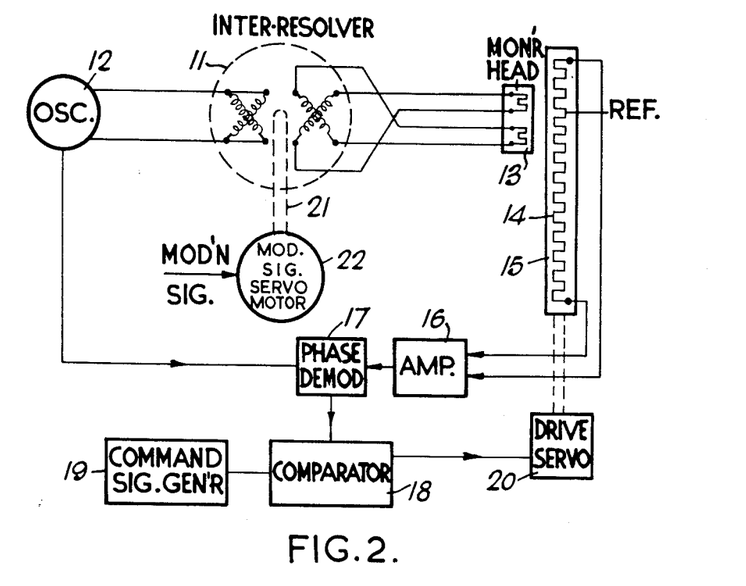
Figure 2 is a diagrammatic illustration of a method of modifying the monitoring signal where an inductive pick-up head monitoring system is used.

In Figure 2 is illustrated a control system in which the modification circuit takes the form of a so-called intermediate resolver 11. In this system, the circuit, ignoring the resolver, is a normal control system of a known type in which a signal from an oscillator 12 is fed to the inductive monitoring head 13. Movement of the head relative to a magnetic reference member 14, which may be in the form of a "wound stator" as used in a linear electric motor, mounted on the movable machine part 15 generates two outputs of sinusoidal wave form in the windings of reference 14, the two outputs being in phase quadrature. These outputs are passed to amplifier 16 and then to a phase demodulator 17. The phase demodulator is also fed with a signal from the oscillator 12. The output from the phase demodulator is fed to a comparator 18. The comparator combines the signal from the phase demodulator with a signal from a command signal generator 19 to give an output which is a function of the two signals. This output signal controls the servo motor 20 which moves the machine part 15. The invention can be applied to this type of system by inserting the intermediate resolver 11 between the oscillator 12 and the monitoring head 13. The resolver 11 is of the four winding two phase type and when shaft 21 is turned through a certain angle moving one set of windings relative to the other, a phase shift corresponding to that angle is obtained. The shaft 21 is turned in either direction by signal servo motor 22 which in turn is controlled by the modification signal representing unwanted movement of the machine parts. The phase shift caused by turning of the shaft 21, with its accompanying windings, causes a modification of the phase of the signal in the monitoring head 13 and thus also a modification of phase of the output signals generated in the windings of reference 14. The phase modification eventually appears at the input to the phase demodulator 17 via amplifier 16. The modification of phase of this signal will modify the output from the phase demodulator to the comparator 18. The sense of the output to the comparator is such as will cause it to control the servo motor 22 so as to move the machine member 15 in a manner to offset the unwanted movement. It should be noted that in this type of system, when there is no commanded relative movement of the motion monitoring head the signal from reference 14 is of the same phase as oscillator 12 and when this is mixed with the direct output from the oscillator in the phase demodulator 17, the latter gives no output. Then if now the shaft 21 is turned in response to a modification signal a phase change will take place in the output from reference 14 and an output will be given from the phase demodulator 17 in the same way as if there had been a commanded relative movement between the monitoring head and the machine part. It will thus be seen that the system can respond to a modification signal to make corresponding correction movement when no commanded relative movement of the machine tool parts is being made.

Where the motion monitoring head is of the optical type, as for example with diffraction gratings and the photo electric cells in a known manner, various ways of modifying the phase of the signals from the photo electric cells are possible.

Figure 3:
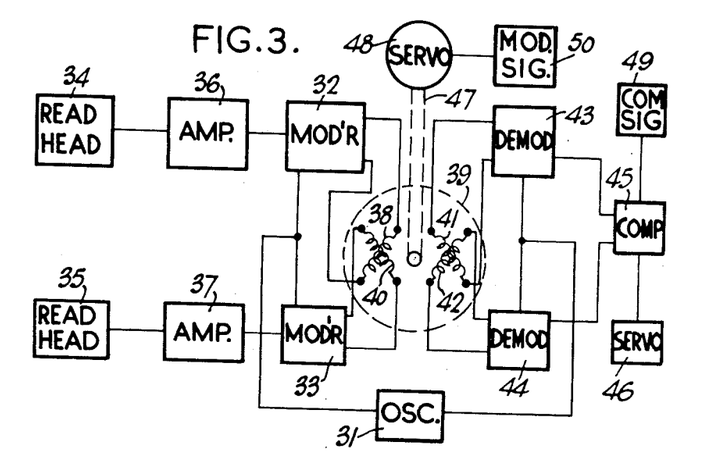
Figure 3 is a diagrammatic illustration of a method for modifying the monitoring signal where a diffraction grating type monitoring system is used.

Figure 3 is an illustration of a control system having photo electric cell motion monitoring heads, the phase modifying circuit again being an intermediate resolver. In a normal system of this type without the addition of the present invention the outputs from the motion monitoring heads would not vary in amplitude and would therefore not be in a form suitable for modification by an intermediate resolver of the same type as above. To overcome this difficulty an oscillator 31 is included in the system. The output from the oscillator is fed to two modulators 32 and 33. The signals originating from motion monitoring heads 34 and 35 are fed via amplifiers 36 and 37 to the modulators 32 and 33 respectively. The output from modulator 32, which may be representative only of the oscillator output or of a combinationation of this output and signal from motion monitoring head 34 if there is one, is fed to winding 38 in resolver 39. The output from modulator 33, which may vary similarly to the output of modulator 32, is fed to winding 40 in the resolver. Windings 41 and 42 of the resolver are connected respectively to phase demodulators 43 and 44, these phase demodulators also receiving a signal from the oscillator 31. The demodulated outputs from the phase demodulators are fed into a comparator 45 which combines these signals with a command signal from a command signal generator 49 as previously described so as to control the movement of a servo motor 46 which moves the machine member. Shaft 47 is rotated by modification signal servo motor 48 in response to modification signals from a modification signal generator 50 representative of unwanted movement of machine parts. Rotation of the shaft 47 causes rotation of one set of windings in resolver 39 relative to the other and thus modifies the phase of the signal being fed from the windings 40 and 41. After phase demodulation in demodulators 43 and 44 respectively, so as to remove the component contributed by the oscillator 31 to the outputs of the modulators 32 and 33, the signals applied to comparator 45 correspond to the outputs of the monitoring heads 34 and 35 with the appropriate modification signal added, with due regard to sign, and if there are no variations in the outputs from the motion monitoring heads the outputs from demodulators 43 and 44 will represent the modification signal alone. The modification of signal will finally cause the comparator to control the servo motor 46 so as to correct for any unwanted movement which originates the modification signal.

Instead of using a rotary resolver as described in the previous examples it is possible to obtain a similar modification of the phase of the motion monitoring signals by selective switching of the outputs of the amplifiers of the photo electric cells in the monitoring heads. The amplifiers are of the twin anode complementary output type, the outputs being differential. At any one time only the output from one anode is used. The outputs from the amplifiers are passed to trigger circuits of the Schmitt type in which the sine and cosine waveforms are transformed into rectangular pulses, having the same phase relationship, the transition of the pulses in sign triggering the circuit. The trigger circuits produce an output pulse at each change of sign of the waveform. If the outputs from the anodes of each amplifier are fed, via switches to two trigger circuits simultaneous switching of the individual trigger inputs from one anode of each amplifier to the other anode of the other amplifier will have the effect of moving the phases of the two signals by 90° by causing a change of sign of one or the other of the rectangular wave-forms and will produce a pulse from the relevant trigger circuit. This pulse is fed into the control system being representative of an unwanted movement of some part of the machine.

Figure 4:
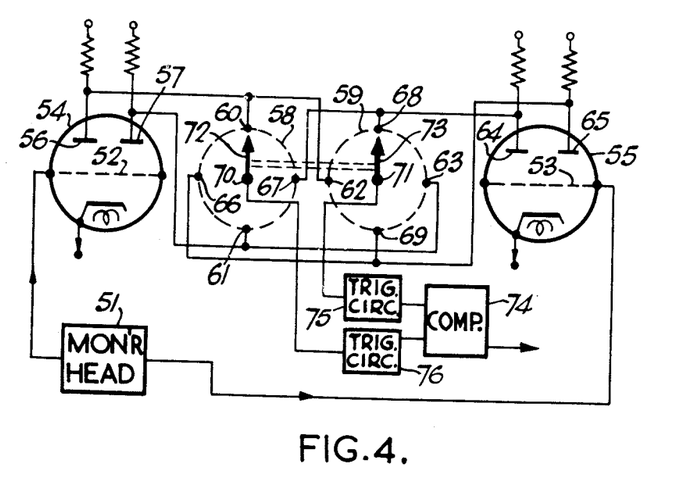
Figure 4 is a circuit diagram illustrating a method of phase shifting the monitoring signals.

Figure 4 is a circuit diagram of one form of the switching system described above. Motion monitoring signals from photo electric cells in monitoring heads 51 are fed to grids 52, 53 of amplifiers 54, 55. These amplifiers are of the twin anode complementary output type in which the output from one anode is 180° out of phase with the output from the other anode. Anodes 56 and 57 of the amplifier 54 are connected to two contacts 60, 61 on switch 58 and also to two contacts 62, 63 on switch 59. The contacts are spaced 180° apart on each switch. Anodes 64, 65 of the amplifier 55 are connected to two further contacts 66, 67 on switch 58 and also two further contacts 68, 69 on switch 59. The contacts to which the anodes 64, 65 are connected are also spaced 180° apart and are intermediate between the contacts to which the anodes 56, 57 are connected. Spindles 70, 71 of the switches 58 and 59 are connected together and move in unison, the contacts on the switches being so arranged that contact 60 on switch 58 is 90° ahead of contact 62 on switch 59 when clockwise rotation is considered. Wiper blades 72, 73 are mounted on the spindles 70, 71, and move with them. Wiper 72 engages contacts 60, 67, 61, 66, and then 60, in that order while wiper 73 engages contacts 68, 63, 69, 62 and then 68 in that order. The spindles 70, 71 may be rotated by a modification signal servo motor, not shown, which is controlled by the signal generating means which detect the unwanted movement of a machine part as above. Alternatively the spindles may be rotated by a pulse mechanism. The spindles may be rotated continuously or step by step, but the wiper blades 72, 73 are arranged to move step by step so that each wiper blade is always in engagement with a contact except at the instant of changeover. The outputs from the wiper blades 72, 73 are passed to trigger circuits 75 and 76 of the Schmitt type.

The system operates as follows:

The production of a modification signal due to some erratic movement of a machine part, results in a rotation of the modification signal servo motor, which rotates the spindles 70 and 71. When the modification signal reaches a value large enough to cause significant movement of the spindles, the wiper blades 72 and 73 will move either one way or the other, from contact 60 and 68 to contacts 67 and 63 or contacts 66 and 62, depending upon the sign of the modification signal. Outputs from amplifier 54 are always a function of the sinusoidal output signal, anode 56 being positive going in sign and anode 57 negative going in sign when relative movement of the monitoring heads commences from an end datum point. Outputs from amplifier 55 are always a function of the cosinusoidal output signal, anode 64 being positive going in sign and anode 65 negative going in sign under similar conditions. Clockwise rotation of the spindles 70 and 71 will cause the anodes to be connected to the trigger circuits in the following sequence: trigger circuit 76 to anode 56 then 64, then 57 and finally 65; trigger circuit 75 to anode 64, then 57, then 65 and finally 56. Assuming that there is no relative motion of the monitoring head then the signals being fed to the two trigger circuits are thus first +sine+cosine, second +cosine−sine, third −sine−cosine and finally −cosine+sine functions. It will be seen that only one sign alters at each movement of the switch and it is this alteration which causes the trigger circuit to fire and inject a pulse into the control system. This is the same effect as if the phase of the two signals from the photo electric cells were simultaneously altered by 90°. The pulse injected into the control system from one or other of the trigger circuits is fed to comparator 74, which will control the movement the servo motor moving the machine member so as to correct for the effect of the erratic movement. However, if the machine member is moving and thus causing relative movement of the monitoring head then the outputs of the amplifier 54 will still be a function of the sine wave but the anode 56 will vary positive to negative and back and similarly anode 57 will vary in sign. Outputs of the amplifier 55 will be a function of the cosine wave but again the signs of the anodes will vary.

These changes of sign will of course cause pulses to be produced from the trigger circuits and will comprise the normal motion monitoring signals. Under these conditions the switching of the trigger inputs will have the effect of advancing or retarding the next pulse thus in effect cancelling or adding a pulse.

In the system as just described if the switching should occur at the instant when the sign of one of the wave forms is changing due to the relative motion of the monitoring heads then a loss of a pulse is likely to occur. If the trigger circuits are switched such that the equivalent phase change is 45° the possible loss of a pulse is avoided. This phase change can be obtained by suitably modifying the switching mechanism as described above in conjunction with Figure 4. Alternatively, a similar effect can be obtained by the use of feedback amplifiers of the summation type.

Figure 5:
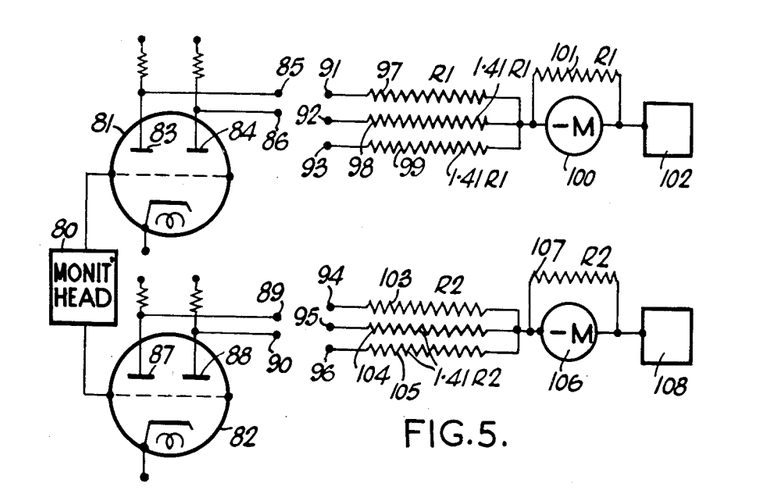
Figure 5 is a further circuit diagram illustrating a method of phase shifting the monitoring signals.

A circuit using such amplifiers of the summation type is shown in Figure 5. Assuming no relative motion of the movement monitoring head is taking place then the signal wave forms from the head may be considered as "frozen," at a particular point in the two quadrature wave forms corresponding to a vectorial angle $\theta$. The outputs from the motion monitoring head 80 are fed to two amplifiers 81 and 82 of the twin anode complementary output type. The sine wave output is fed to the amplifier 81 and the cosine wave output to the amplifier 82. The outputs from anodes 83 and 84 of amplifier 81 are taken to terminals 85 and 86 respectively. Similarly the outputs from anodes 87 and 88 of amplifier 82 are taken to terminals 89 and 90 respectively. The contacts 85, 86, 89 and 90 are selectively switched to contacts 91, 92, 93, 94, 95 and 96. Contacts 91, 92 and 93 are connected through resistors 97, 98 and 99, respectively to a summation amplifier 100, a resistor feedback 101 being connected across the amplifier. The output of the amplifier is fed to a Schmitt type trigger circuit 102. Contacts 94, 95 and 96 are connected through resistors 103, 104 and 105 to a further summation amplifier 106, a resistor feedback 107 being connected across the amplifier. The output of this further amplifier is also fed to another Schmitt type trigger circuit 108. The values of resistors 91, 92, 93 and 101 are a function of $R_1$, as shown, and resistors 94, 95, 96 and 107 are a function of $R_2$ as shown. The two sets of contacts are connected as in Table I, which gives the output signals at the various angles of equivalent phase displacement in multiples of 45°.

Table I

| $\theta$ | Points | | | | Output to 102 | Output to 108 |
|---|---|---|---|---|---|---|
| | 85 | 86 | 89 | 90 | | |
| $\theta$ | | 91 | | 94 | $+\sin\theta$ | $+\cos\theta$. |
| $\theta+45$ | 96 | 92 | | 93 & 95 | $+.707\sin\theta+.707\cos\theta$. | $+.707\cos\theta-.707\sin\theta$. |
| $\theta+90$ | 94 | | | 91 | $+\cos\theta$ | $-\sin\theta$. |
| $\theta+135$ | 92 & 96 | | 95 | 93 | $-.707\sin\theta+.707\cos\theta$. | $-.707\cos\theta-.707\sin\theta$. |
| $\theta+180$ | 91 | | 94 | | $-\sin\theta$ | $-\cos\theta$. |
| $\theta+225$ | 92 | 96 | 93 & 95 | | $-.707\sin\theta-.707\cos\theta$. | $-.707\cos\theta+.707\sin\theta$. |
| $\theta+270$ | | 94 | | 91 | $-\cos\theta$ | $+\sin\theta$. |
| $\theta+315$ | | 92 & 96 | 93 | 95 | $+.707\sin\theta-.707\cos\theta$. | $+.707\cos\theta+.707\sin\theta$. |
| $\theta+360$ | | 91 | | 94 | $+\sin\theta$ | $+\cos\theta$. |

A six pole eight position switch is required and will have the switching sequence as in Table II. This arrangement takes into account the sign reversing characteristic of the summing amplifiers.

Table II

| $\theta$ | Switch Rotor Points | | | | | |
|---|---|---|---|---|---|---|
| | Output to 102 | | | Output to 108 | | |
| | 91 | 92 | 93 | 94 | 95 | 96 |
| | | 86 | | 90 | | |
| +45 | | 86 | 90 | | 90 | 85 |
| +90 | 90 | | | 85 | | |
| +135 | | 85 | 90 | | 89 | 85 |
| +180 | 85 | | | 89 | | |
| +225 | | 85 | 89 | | 89 | 86 |
| +270 | 89 | | | 86 | | |
| +315 | | 86 | 89 | | 90 | 86 |
| +360 | 86 | | | 90 | | |

The switch can be operated by a servo motor controlled by a modification signal from signal generating heads representing an unwanted movement of a machine part. From Table I it will be seen that there is a change of sign of one of the wave forms at each 90° of switching. This sign change will result in a pulse being injected into the control system by the trigger circuit, the sense of the pulse depending upon the direction of phase change. When there is relative movement of the motion monitoring head then normal sign from the monitoring head will be fed through which ever particular paths of the circuit are connected, the sign changes of the sine and cosine wave forms producing monitoring pulses from the trigger circuits in the normal way. Any selective switching caused by a modification signal under these conditions will cause modification of the wave forms which will advance or retard the wave forms depending upon the sign of the phase modification.

Figure 6:
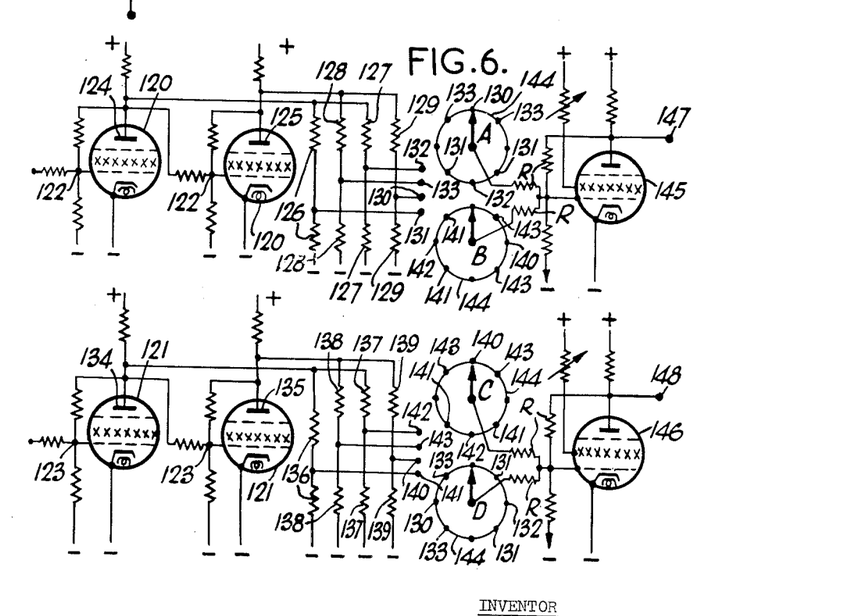
Figure 6 is yet another circuit diagram illustrating a method of phase shifting the monitoring signals.

A circuit diagram for a modified switching system for a 45° phase change is shown in Figure 6. In this arrangement, photo electric cell amplifiers 120 and 121 together with resistor networks 122 and 123 correspond to the amplifiers 54 and 55 of Figure 4. Anodes 124 and 125 are connected to resistance networks 126 and 127 and 128 and 129 respectively, the outputs from the networks being fed to terminals 130, 131, 132, and 133. Similarly anodes 134 and 135 are connected to resistance networks 136 and 137 and 138 and 139 respectively and thence to terminals 140, 141, 142 and 143. The values of the resistors in networks 127, 129, 137 and 139 are arranged so as to give a predetermined output level which may be regarded as unity gain. Networks 126, 128, 136, and 138 are arranged so as to give a predetermined level at .707 gain. Assuming, as previously described that there is no relative movement of the motion monitoring head, and that the signal wave forms are therefore "frozen" at a particular point in the two quadrature wave forms corresponding to a vectorial angle $\theta$, then if the input to amplifier 120 is $\sin\theta$, the outputs to the terminals 130, 131, 132 and 133 will be: $+\sin\theta$, $-.707\sin\theta$, $-\sin\theta$ and $+.707\sin\theta$ respectively. Again, if the input to the amplifier 121 is $\cos\theta$ then the outputs to the terminals 140, 141, 142 and 143 will be $+\cos\theta$, $-.707\cos\theta$, $-\cos\theta$ and $+.707\cos\theta$ respectively. A four pole eight position switch 144 shown diagrammatically, selectively connects the said terminals to summation amplifiers 145 and 146 the switch being turned by the modification signal servo motor, not shown.

The outputs from the summation amplifiers are respectively of the form $\sin(\theta+\phi)$ and $\cos(\theta+\phi)$ where $\phi$ is the effective phase change of the monitor signals, in this case a multiple of 45°. These outputs are fed to trigger circuits as in the previous examples. The following table sets out the outputs obtained from the output terminals of the summation amplifiers for the various positions of the common switch wiper shaft.

Table III

| $\theta$ | Wiper Blades | | | | Terminal 147 | Terminal 148 |
|---|---|---|---|---|---|---|
| | A | B | C | D | | |
| $\theta$ | 130 | | 140 | | $+\sin\theta$ | $+\cos\theta$. |
| $\theta+45$ | 133 | 143 | 143 | 131 | $+.707\sin\theta+.707\cos\theta$. | $+.707\cos\theta-.707\sin\theta$. |
| $\theta+90$ | | 140 | | 132 | $+\cos\theta$ | $-\sin\theta$. |
| $\theta+135$ | 131 | 143 | 141 | 131 | $-.707\sin\theta+.707\cos\theta$. | $-.707\cos\theta-.707\sin\theta$. |
| $\theta+180$ | 132 | | 142 | | $-\sin\theta$ | $-\cos\theta$. |
| $\theta+225$ | 131 | 141 | 141 | 133 | $-.707\sin\theta-.707\cos\theta$. | $-.707\cos\theta+.707\sin\theta$. |
| $\theta+270$ | | 142 | | 130 | $-\cos\theta$ | $+\sin\theta$. |
| $\theta+315$ | 133 | 141 | 143 | 133 | $+.707\sin\theta-.707\cos\theta$. | $+.707\cos\theta+.707\sin\theta$. |
| $\theta+360$ | 130 | | 140 | | $+\sin\theta$ | $+\cos\theta$. |

The outputs at terminals 147 and 148 take into account the sign reversing characteristic of the summation amplifiers.

Figure 7:
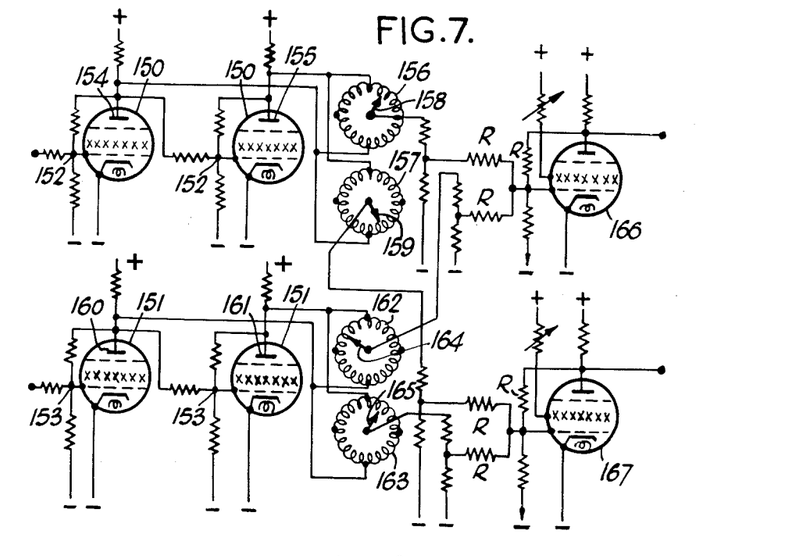
Figure 7 is still another circuit diagram illustrating a method of phase shifting the monitoring signals.
Figure 8:
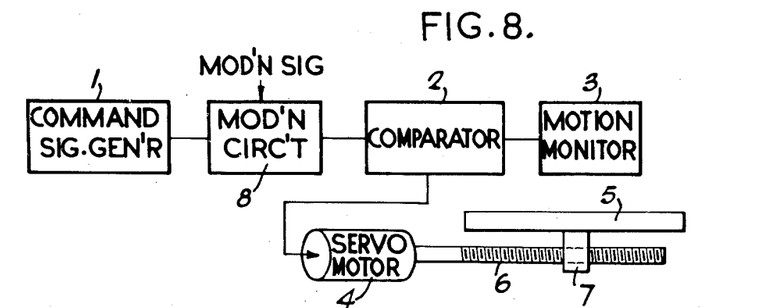
Figure 8 is a schematic diagram illustrating a typical servo control system where the phase of the command signal is modified.

A further refinement of the invention provides a continuous variation of the phase of the monitor signals in accordance with the modification signal the circuit for this embodiment of the invention is shown in Figure 7. The outputs from the photo electric cells in the motion monitoring heads are fed to amplifiers 150 and 151 via resistance networks 152 and 153, as in the previous example. The outputs from 154 and 155 of amplifier 150 are fed to two potentiometers 156 and 157 each having resistance elements connected together in a closed series circuit swept by a wiper making contact with successive turns of a toroidal element or with successive taps between incremental resistance elements (for instance by means of a switch with resistors connected across adjacent contacts). The output from anode 155 is connected to the two potentiometers 180° ahead of the connections of the outputs from anode 154. Two wiper blades 158 and 159 sweep round in contact with successive resistance elements of the potentiometers, wiper 159 being 90° ahead of wiper 158 considering clockwise rotation. Similarly, the outputs from anodes 160 and 161 of amplifier 151 are fed to two potentiometers 162 and 163, similar to potentiometers 156 and 157, the output from anode 161 being connected 180° ahead of that of anode 160, with two further wiper blades 164 and 165 sweeping round in contact with the successive resistance elements of the potentiometers. Wiper 165 is 90° ahead of wiper 164, considering clockwise rotation, with wiper 164 being 180° ahead of wiper 159. Signals from the wipers 158 and 164 are fed to summation amplifier 166 and signals from the wipers 159 and 165 are fed to summation amplifier 167. Again in this circuit, where the input signals from the photo electric cells are $\sin \theta$ and $\cos \theta$, the outputs are $\sin (\theta+\phi)$ and $\cos (\theta+\phi)$ respectively, where $\phi$ is the effective phase change of the monitor signals. This phase change has the same angle as that of the angle of rotation of the wipers of the potentiometers. These wipers are ganged together and move in unison, being rotated by the modification signal servo motor. Instead of moving step by step as in previous examples, the wipers move continuously as long as any modification signal is being fed to the modification signal servo motor. The potentiometers are of the linear or of the sin—cos type, the direction of rotation of the wipers being dependent upon the sense of the modification signal. The outputs from the summation amplifiers are again fed to trigger circuits as in previous examples. The purpose of this arrangement is to give a closer approach to a continuously variable phase adjustment of the monitor signals and though it has been shown above that discontinuously variable phase adjustment will suffice in certain circumstances, for the highest accuracy a close approach to a continuously variable phase change is to be preferred.

Where instead of modifying the phase of the motion monitoring signal it is desired to feed the modification signals in on the command signal side of the system then the system will be generally as shown in Figure 8. It will be seen that this system is very similar to that shown in Figure 1 the only difference being that the modification circuit 8 is inserted between the command signal generator 1 and the comparator 2.

For this form of control system, in which the phase of the command signal is modified, it is necessary that the signal is of a cyclic nature. In normal control systems this cyclic signal will be converted into pulse form for use by the comparator, as is normally also done with the cyclic motion monitoring signal. The command signal is also likely to be of a discontinuous nature, depending upon the movement requirements for the machine part. In order that the command signal be able to indicate the direction of movement of the machine part it may conveniently comprise two cyclic wave form signals the phase relationship of which will indicate the required direction of movement of the machine part. For example the two signals may be of sine wave form, the phase of one wave form being displaced by 90° or 270° relative to the other wave form, depending upon whether the machine part is to move in a forward or a reverse direction. Thus the command signal is very similar to the motion monitoring signal and means similar to that used for modifying the phase of the monitoring signal may be used for modifying the phase of the command signal.

Figure 9:
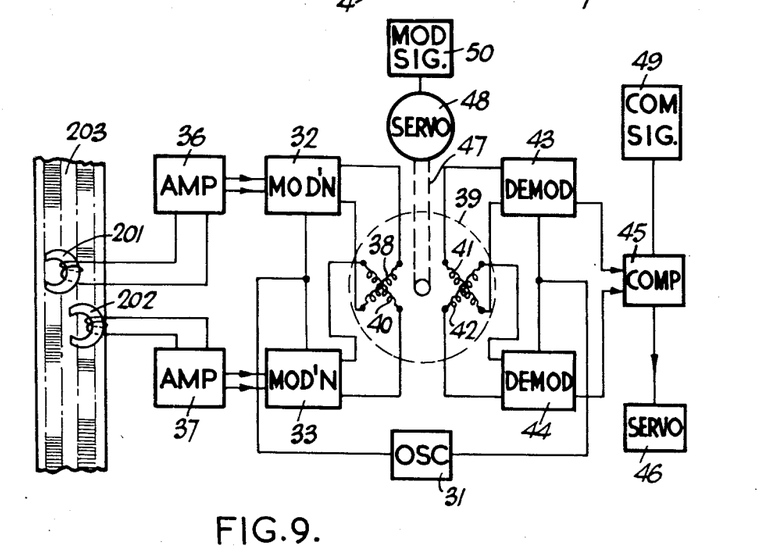
Figure 9 is a diagramatic illustration of one method of phase shifting the command signal.

Figure 9 shows a circuit for altering the phase of the command signal by means of a rotary intermediate resolver. As stated above this circuit is very similar to that used in altering the phase of the monitoring signal, and illustrated in Figure 3. The only difference is that the reading heads 201 and 202 read signals on for example a tape 203 instead of indicating the movement of a machine part as is done by the heads 34 and 35 in Figure 3. Similarly, where no movement of the machine part was called for by the command signal generator then the signals would not vary and would be unsuitable for phase shifting by a rotary resolver; this difficulty is overcome by the oscillator 31 together with modulators 31 and 33 and demodulators 43 and 44 in the same manner as for the system, shown in Figure 3, for the monitoring signal phase shifting.

Figure 10:
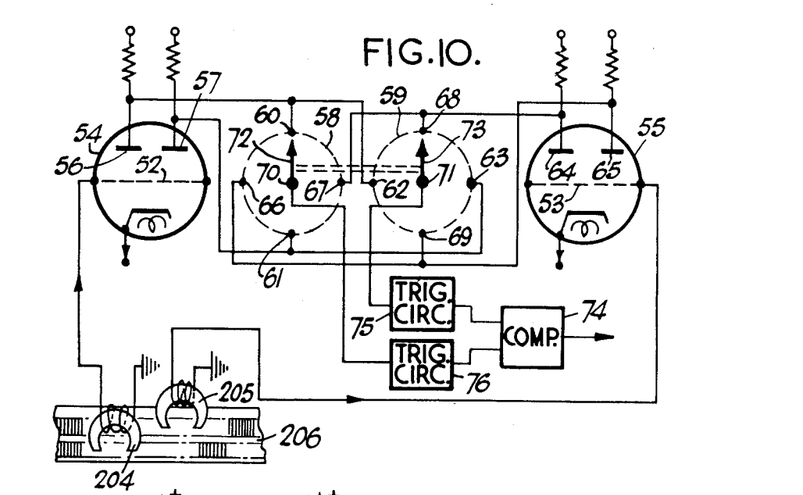
Figure 10 is a diagrammatic illustration of a further method of phase shifting the command signal.

Figure 10 shows a system of selective switching of the signals from the reading heads, which is, generally, the same as the system shown in Figure 4. The only difference is again that of the reading heads 204 and 205 which read signals on tape 206. The signals from the reading heads 204 and 205 are fed to the amplifiers 54 and 55 respectively.

Selective switching circuits similar to those shown in Figures 5, 6 and 7 may also be used for the phase shifting of the command signal.

Figure 11:
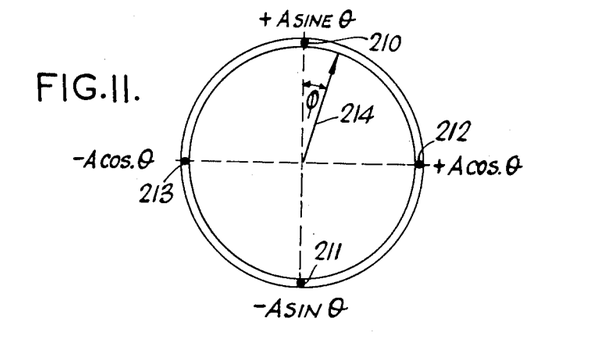
Figure 11 is a diagrammatic illustration of a particular form of potentiometer forming a feature of the invention, and circuit diagrams.
Figure 12:
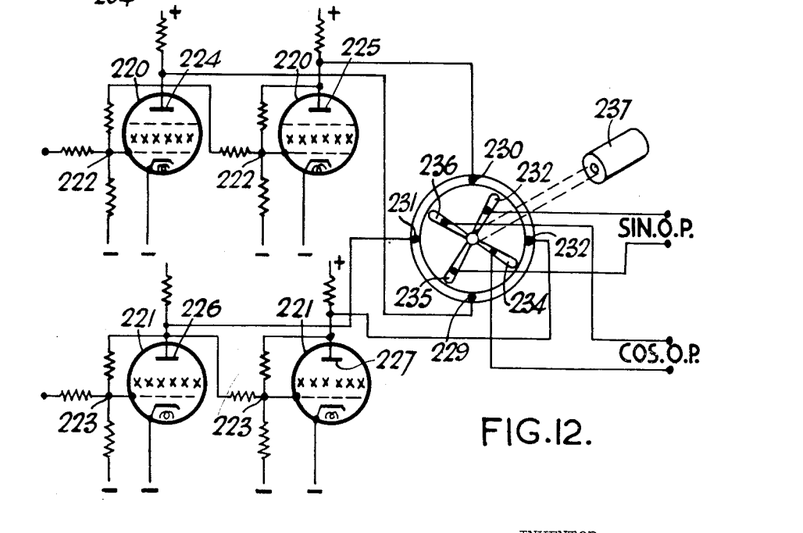
Figure 12 is a circuit diagram illustrative of yet a further method of shifting the phase of a signal.

In the examples shown in Figures 5, 6, and 9, 7, and described above, the addition of sine and cosine signals is obtained by the use of summation type amplifiers. In a further feature of the invention, as shown in Figures 11 and 12, the summation of the sine and cosine signals is carried out by using a single toroidal wound potentiometer, to which are fed the sine and cosine signals, the summation being done in the potentiometer. The procedure is as follows. Figure 11 illustrates a toroidal wound potentiometer. Two waveforms $\pm A.\sin \theta$ and $\pm A.\cos \theta$ are fed to four tappings 210, 211, 212 and 213 on the winding. A wiper arm 214 moves in a clockwise direction and is at an angle $\phi$ from a datum as shown. Two forms of potentiometer may be used, one having a linear form of winding the other having a winding such that the output is proportional to the cosine of the angle of rotation of the wiper; the tappings on the winding to which the signals are fed being at the maximum and zero output points.

Where a potentiometer having a linear form of winding is used the electrical phase shift $\psi$ is only approximately proportional to the mechanical phase shift $\phi$. This is shown as follows:

(a) At $\phi$, the output consists of the algebraic sum of the sine and cosine components and is as follows:

$$\text{Sine component: } \frac{\frac{\pi}{2}-\phi}{\frac{\pi}{2}} \cdot + A \cdot \sin \theta$$

$$\text{Cosine component: } \frac{\phi}{\frac{\pi}{2}} \cdot + A \cdot \cos \theta$$

∴ total output is given by $$E_1 = A \cdot \left\{ + \frac{\frac{\pi}{2}-\phi}{\frac{\pi}{2}} \cdot \sin \theta + \frac{\phi}{\frac{\pi}{2}} \cdot \cos \theta \right\} \quad (1)$$

It may be shown that $$a.\sin \theta + b.\cos \theta = c.\sin (\theta+\psi) \quad (2)$$

where $$c = \pm \sqrt{a^2+b^2}$$

and $$\psi = \tan^{-1} \frac{b}{a}$$

∴ from (1) and (2):

$$E_1 = A \cdot \left\{ \sqrt{\left(\frac{\frac{\pi}{2}-\phi}{\frac{\pi}{2}}\right)^2 + \left(\frac{\phi}{\frac{\pi}{2}}\right)^2} \cdot \sin (\theta+\psi) \right\} \quad (3)$$

where $$\psi = \tan^{-1} \frac{\phi}{\frac{\pi}{2}-\phi}$$

(b) At
$$\left(\phi+\frac{\pi}{2}\right)$$
similarly—

$$E_2 = A \cdot \left\{ -\frac{\phi}{\frac{\pi}{2}} \cdot \sin\theta + \frac{\frac{\pi}{2}-\phi}{\frac{\pi}{2}} \cdot \cos\theta \right\}$$

$$\therefore E_2 = A \cdot \left\{ \sqrt{\left(-\frac{\phi}{\frac{\pi}{2}}\right)^2 + \left(\frac{\frac{\pi}{2}-\phi}{\frac{\pi}{2}}\right)^2} \cdot \sin(\theta+\psi^1) \right\} \quad (4)$$

where
$$\psi^1 = \tan^{-1}\frac{\frac{\pi}{2}-\phi}{-\phi}$$

Since
$$\tan\psi^1 = -\frac{1}{\tan\psi}$$

then
$$\psi^1 = \left(\psi + \frac{\pi}{2}\right)$$

$$\therefore \sin(\theta+\psi^1) = \sin\left(\theta+\psi+\frac{\pi}{2}\right) = \cos(\theta+\psi) \quad (5)$$

∴ from (4) and (5) and re-arranging:

$$E_2 = A \cdot \left\{ \sqrt{\left(\frac{\frac{\pi}{2}-\phi}{\frac{\pi}{2}}\right)^2 + \left(\frac{\phi}{\frac{\pi}{2}}\right)^2} \cdot \cos(\theta+\psi) \right\} \quad (6)$$

where
$$\psi = \tan^{-1}\frac{\phi}{\frac{\pi}{2}-\phi}$$

(c) At $(\phi+\pi)$ similarly:

$$E_3 = -A \cdot \left\{ \sqrt{\left(\frac{\frac{\pi}{2}-\phi}{\frac{\pi}{2}}\right)^2 + \left(\frac{\phi}{\frac{\pi}{2}}\right)^2} \cdot \sin(\theta+\psi) \right\} \quad (7)$$

$$= -E_1 \quad (7a)$$

(d) At
$$\left(\phi+\frac{3\pi}{2}\right)$$
similarly:

$$E_4 = -A \cdot \left\{ \sqrt{\left(\frac{\frac{\pi}{2}-\phi}{\frac{\pi}{2}}\right)^2 + \left(\frac{\phi}{\frac{\pi}{2}}\right)^2} \cdot \cos(\theta+\psi) \right\} \quad (8)$$

$$= -E_2 \quad (8a)$$

If the parameters $$\sqrt{\left(\frac{\frac{\pi}{2}-\phi}{\frac{\pi}{2}}\right)^2 + \left(\frac{\phi}{\frac{\pi}{2}}\right)^2}$$

and $$\tan^{-1}\left(\frac{\phi}{\frac{\pi}{2}-\phi}\right)$$

are plotted against $\phi$, it will be seen that the amplitude of the output varies from 1 to 0.707 in a cyclic manner, repeating every $$\frac{\pi}{2}$$

radians; the electrical phase shift $\psi$, is approximately proportional to the mechanical phase shift $\phi$, and varies a few degrees from it in a similar cyclic manner.

The accuracy obtained with linearly wound potentiometers is likely to be high enough for many applications, but where a higher degree of accuracy is required then the second form of potentiometer is used. The electrical phase shift $\psi$ with this form of potentiometer will be proportional to the mechanical phase shift $\phi$ as follows:

(a) At $\phi$, the output consists of the algebraic sum of the sin $\theta$ and cos $\theta$ terms and is as follows:

$$\begin{aligned} E_1 &= +A.\sin\theta.\cos\phi + A.\cos\theta.\cos(90-\phi) \\ &= +A.\sin\theta.\cos\phi + A.\cos\theta.\sin\phi \\ &= +A.\sin(\theta+\phi) \end{aligned} \quad (9)$$

(b) At $(\phi+90°)$, similarly, $$\begin{aligned} E_2 &= +A.\sin\theta.\cos(90+\phi) + A.\cos\theta.\cos\phi \\ &= -A.\sin\theta.\cos(90-\phi) + A.\cos\theta.\cos\phi \\ &= -A.\sin\theta.\sin\phi + A.\cos\theta.\cos\phi \\ &= +A.\cos(\theta+\phi) \end{aligned} \quad (10)$$

(c) At $(\phi+180°)$, similarly, $$\begin{aligned} E_3 &= +A.\sin\theta.\cos(180+\phi) + A.\cos\theta.\cos(90+\phi) \\ &= -A.\sin\theta.\cos\phi - A.\cos\theta.\cos(90-\phi) \\ &= -A.\sin\theta.\cos\phi - A.\cos\theta.\sin\phi \\ &= -A.\sin(\theta+\phi) \end{aligned} \quad (11)$$

(d) At $(\phi+270)$, similarly, $$\begin{aligned} E_4 &= +A.\sin\theta.\cos(270+\phi) + A.\cos\theta.\cos(180+\phi) \\ &= +A.\sin\theta.\cos(90-\phi) - A.\cos\theta.\cos\phi \\ &= -A.\sin\theta.\sin\phi - A.\cos\theta.\cos\phi \\ &= -A.\cos(\theta+\phi) \end{aligned} \quad (12)$$

If four wiper arms, spaced 90° apart, are provided then four outputs will be obtained in the form of the Equations 3, 4, 7a and 8a or 9, 10, 11 and 12, above, depending upon the type of potentiometer used.

The application of such a potentiometer is shown in Figure 12, being a modification of the circuits shown in Figures 6 and 7. The outputs from the photo electric cells in the monitoring heads are fed to amplifiers 220 and 221 via resistance networks 222 and 223. The outputs from the anodes 224, 225, 226, and 227 of the amplifiers 220 and 221 are fed to a toroidal wound potentiometer 228. Outputs 224, 225, 226, and 227 are connected to tappings 229, 230, 231, and 232 respectively, tappings 229 and 230 being 180° apart and tappings 231 and 232 being positioned midway between the other tapping and thus also 180° apart. Four wiper arms 233, 234, 235, and 236 are mounted on a common shaft, being rotated clockwise by a modification signal servo motor 237. Outputs are taken from each of the wiper arms and give a sine wave output signal and a cosine wave output signal, as shown, the phase of which has been modified relative to the input signal from the monitoring head.

The use of toroidal wound potentiometers with four wiper blades, as described above, provides a convenient system where phase modification by more than one error modification source is required. In such a case, the outputs from the wiper arms of one potentiometer, having been phase modified by one modification source, are fed on to the tappings of a further toroidal potentiometer where the phase of the signals may be further modified by another modification source. It thus provides a simple system for the adding in of phase modifications arising from errors detected by error detecting means at various positions on a machine tool, since the number of toroidal potentiometers can be increased depending upon the number of modification signal sources provided.

I claim:

1. A servo system for controlling the operation of driving means for producing the movement of a first object relative to a second object the system comprising monitoring means for indicating the movement of the first object relative to the second object the output of the monitoring means taking the form of a cyclic monitor signal the frequency of which is a function of the velocity of said movement, means responsive to two incoming signals for controlling the driving means in conformity with such signals in combination in a feedback servo loop, one of said incoming signals being a command signal and the other of said incoming signals being the said cyclic monitoring signal and means responsive to modification signals for shifting the phase of one of the said incoming signals whereby the response of the said feedback servo loop to the said command signal is modified under control of the said modification signals.

2. A servo system for controlling the operation of driving means for producing the movement of a first object relative to a second object, monitoring means for indicating the movement of the first object relative to the second object, the output of the monitoring means taking the form of cyclic monitor signals the frequency of which is a function of the velocity of said movement, means for controlling the driving means in conformity with incoming command signals in combination with the said cyclic monitor signals in a feedback servo loop, and means responsive to incoming modification signals for shifting the phase of the said cyclic monitor signals, whereby the response of the said feedback servo loop to the said command signals is modified under control of the said modification signals.

3. A servo system for controlling the operation of driving means for producing the movement of a first object relative to a second object, the system comprising monitoring means for indicating the movement of the first object relative to the second object, the output of the monitoring means taking the form of cyclic monitor signals the frequency of which is a function of the velocity of the said movement, means for controlling the driving means in conformity with incoming cyclic command signals, the frequency of which is a function of the velocity of the required relative movement between the said two objects, in combination with the said cyclic monitor signals in a feedback servo loop, and means responsive to incoming modification signals for shifting the phase of the said cyclic command signals, whereby the response of the said feedback servo loop to the said command signals is modified under control of the said modification signals.

4. A servo system as claimed in claim 1 in which the said means responsive to modification signals for shifting the phase of one of the incoming signals comprises a rotary resolver having two sets of cooperating windings capable of relative rotation, one of the said incoming signals being fed to one of the sets of windings and appearing as an output signal from the other set of windings, and means responsive to the said modification signals for causing relative rotation between the two sets of windings whereby a corresponding phase change is made to the said incoming signal in passage through the resolver.

5. A servo system as claimed in claim 1 in which the said incoming signal, the phase of which is to be shifted in response to modification signals, comprises two cyclic signals in quadrature, and the said means responsive to the modification signals for shifting the phase of the said incoming signal comprises a first and a second rotary switch, each switch having four equally spaced contacts, the contacts of the first switch being in phase with the contacts of the second switch, one of the said quadrature signals being fed and diametrically opposite contacts of the first switch and also to contacts of the second switch diametrically opposite but displaced by 90° relative to the first switch, the other of the said cyclic quadrature signals being fed to the other diametrically opposite contacts of the first switch and of the second switch, each switch having a rotatable wiper blade contacting each of the said contacts in each switch in sequence, the two blades being coupled together but electrically insulated, and rotating in phase, each of the said blades providing an output signal and means responsive to the said modification signal for causing step by step rotation of the said wiper blades from contact to contact in accordance with the modification signals, whereby a corresponding phase change is made to the said incoming signal when appearing at the output of the said rotary switches.

6. A servo system as claimed in claim 5 in which additional contacts are provided on the rotary switches at positions intermediate the said contacts hereinafter called the main contacts, both the said cyclic quadrature signals being fed to the said additional contacts but at a value which is equal to sine $\theta$ of their original value, where $\theta$ is the angle between the said additional contact and the previous said main contact, and the means responsive to the said modification signals causing rotation of the said blades in steps of 45° from contact to contact, the outputs of signals from the said blades being fed to summation amplifiers whereby the said input signal appears at the output of the said summation amplifiers with a phase change of 45° for each 45° rotational step of the blades.

7. A servo system as claimed in claim 1 in which the said incoming signal, the phase of which is to be shifted in response to modification signals, comprises two cyclic signals in quadrature and the said means responsive to modification signals comprises a first and a second toroidal wound potentiometer, each potentiometer having a first and a second wiper blade coupled together but insulated electrically one from the other, the second wiper blade of each potentiometer being 90° in advance of the respective first wiper blade in the direction of rotation of the wiper blades, the first wiper blade of the first potentiometer being 90° in advance of the first wiper blade of the second potentiometer, in the direction of rotation, each potentiometer having four equally spaced tappings the tappings of the first potentiometer being in the same relative positions as the tappings of the second potentiometer, one of the said cyclic quadrature signals being fed to diametrically opposite tappings of the first potentiometer and being fed also to tappings of the second potentiometer which are diametrically opposite but displaced by 90° relative to the first potentiometer, the other of the said cyclic quadrature signals being fed to the other diametrically opposite tappings of the first potentiometer and of the second potentiometer means responsive to the said modification signals for causing rotation of the said wiper blades in accordance with the modification signals the output from the said first wiper blade of each potentiometer being fed to a first summation amplifier, and the output from the said second wiper blade of each potentiometer being fed to a second summation amplifier, whereby the said input signal appears at the output of the said summation amplifiers with a phase change corresponding to the rotation of the wiper blades.

8. A servo system as claimed in claim 2 in which the said monitoring means is of the inductosyn type, comprising an induction monitor head fed by an oscillator, and in which the said means responsive to modification signals for shifting the phase of the cyclic monitoring signals comprises a rotary resolver having two sets of cooperating windings capable of relative rotation, the said monitoring signals being fed to one of the sets of windings and appearing as an output signal from the other set of windings, and means responsive to the said modification signals for causing relative rotation between the two sets of windings whereby a corresponding phase change is made to the said monitoring signals in passing through the resolver.

No references cited.